US012638125B2

(12) United States Patent
Zhang et al.

(10) Patent No.: US 12,638,125 B2
(45) Date of Patent: May 26, 2026

(54) WIRE BONDER AND GAS PIPE CONNECTOR THEREFOR

(71) Applicants: Diodes Incorporated, Plano, TX (US); Shanghai Kaihong Technology Co., Ltd, Shanghai (CN); Diodes Technology (Chengdu) Company Limited, Chengdu (CN); Shanghai Kaihong Electronic Company Limited, Shanghai (CN)

(72) Inventors: Huaigang Zhang, Chengdu (CN); Chris Wang, Chengdu (CN)

(73) Assignees: Diodes Incorporated, Plano, TX (US); Shanghai Kaihong Technology Co., Ltd., Shanghai (CN); Diodes Technology (Chengdu) Company Limited, Chengdu (CN); Shanghai Kaihong Electronic Company Limited, Shanghai (CN)

( * ) Notice: Subject to any disclaimer, the term of this patent is extended or adjusted under 35 U.S.C. 154(b) by 111 days.

(21) Appl. No.: 18/632,955

(22) Filed: Apr. 11, 2024

(65) Prior Publication Data

US 2025/0060067 A1 Feb. 20, 2025

(51) Int. Cl.
 *F16L 59/18* (2006.01)
 *B23K 20/00* (2006.01)
(52) U.S. Cl.
 CPC .......... *F16L 59/182* (2013.01); *F16L 59/188* (2013.01); *B23K 20/004* (2013.01)
(58) Field of Classification Search
 CPC ..... F16L 59/182; F16L 57/04; F16L 25/0072;

F16L 59/021; F16L 59/187; F16L 15/08; F16L 15/006; B23K 20/004; B23K 20/005; B23K 20/007; B23K 20/14
USPC ........ 285/48, 245, 251, 277; 228/4.5, 180.5, 228/904
See application file for complete search history.

(56) References Cited

U.S. PATENT DOCUMENTS

| 1,899,469 | A | * | 2/1933 | Mecom | .................... | F16L 15/08 |
| | | | | | | 285/356 |
| 2,184,980 | A | * | 12/1939 | Smith | .................... | B23K 3/029 |
| | | | | | | 219/230 |
| 2,376,058 | A | * | 5/1945 | Jeffreys | .................... | F16L 15/08 |
| | | | | | | 285/116 |
| 2,860,893 | A | * | 11/1958 | Clark | ...................... | F16L 37/23 |
| | | | | | | 285/98 |
| 2,885,224 | A | * | 5/1959 | Campbell | ............... | F16L 25/02 |
| | | | | | | 285/48 |

(Continued)

*Primary Examiner* — David Bochna
(74) *Attorney, Agent, or Firm* — AP3 Law Firm PLLC

(57) ABSTRACT

A connector for connecting a gas pipe and a heating component of a wire bonder includes a first connection end for connecting the connector to the heating component, and a second connection end for connecting the connector to the gas pipe. A heat-insulation tube is connected between the first connection end and the second connection end. The heat-insulation tube is made of a heat-insulation material and configured to insulate or reduce heat transfer between the first connection end and the second connection end. The connector may further include a first fastening sleeve for fastening the connection between the first connection end and the heat-insulation tube, and a second fastening sleeve for fastening the connection between the second connection end and the heat-insulation tube.

20 Claims, 11 Drawing Sheets

(56)  References Cited

U.S. PATENT DOCUMENTS

| | | | | |
|---|---|---|---|---|
| 3,838,240 A * | 9/1974 | Schelhorn | B23K 20/005 | |
| | | | | 401/2 |
| 4,198,079 A * | 4/1980 | Shah | F16L 33/24 | |
| | | | | 285/259 |
| 4,358,662 A * | 11/1982 | Cranor | B23K 3/029 | |
| | | | | 219/230 |
| 4,928,871 A * | 5/1990 | Farassat | B23K 20/007 | |
| | | | | 228/180.5 |
| 5,026,188 A * | 6/1991 | Capodieci | B05C 17/00546 | |
| | | | | 392/385 |
| 5,065,932 A * | 11/1991 | Hayden | B23K 3/06 | |
| | | | | 222/592 |
| 8,646,675 B2 * | 2/2014 | Lang | H05K 13/06 | |
| | | | | 228/180.5 |
| 12,528,135 B2 * | 1/2026 | Unger | B23K 20/10 | |
| 2001/0042777 A1 * | 11/2001 | Kyomasu | H01L 24/85 | |
| | | | | 228/180.5 |
| 2002/0027152 A1 * | 3/2002 | Ushiki | B23K 20/004 | |
| | | | | 228/8 |
| 2006/0091181 A1 * | 5/2006 | Eder | B23K 9/1336 | |
| | | | | 228/4.5 |
| 2006/0108798 A1 * | 5/2006 | Goodridge | F16L 33/24 | |
| | | | | 285/256 |
| 2006/0219683 A1 * | 10/2006 | Kensrue | B23K 9/28 | |
| | | | | 219/137.31 |
| 2007/0251980 A1 * | 11/2007 | Gillotti | H01L 24/85 | |
| | | | | 228/180.5 |
| 2016/0365331 A1 * | 12/2016 | Takagi | B23K 20/004 | |
| 2022/0307639 A1 * | 9/2022 | Max | F16L 15/003 | |

* cited by examiner

230

5

3

4

1

2

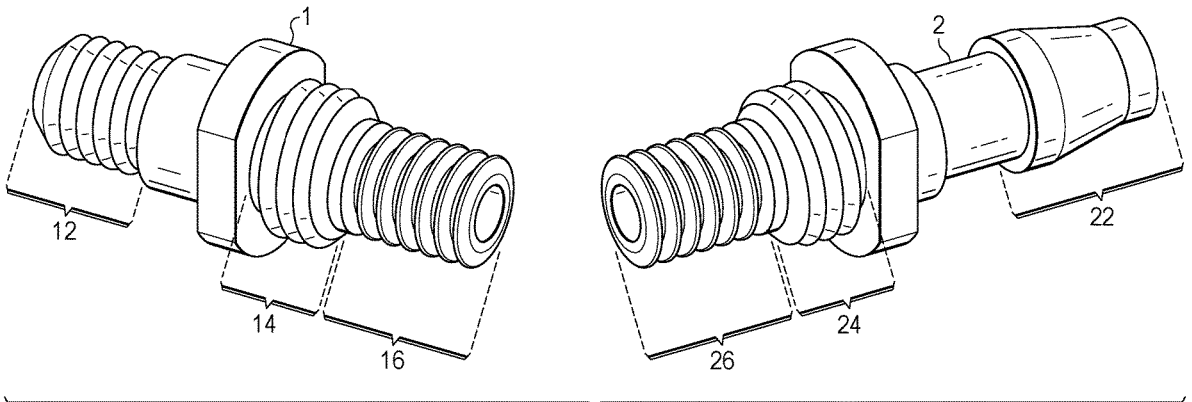

WIRE BONDER AND GAS PIPE CONNECTOR THEREFOR

CROSS-REFERENCE TO RELATED APPLICATIONS

This patent application claims priority to Chinese Application No. 202322181005.6, filed on Aug. 14, 2023 and entitled "A wire bonder and its gas pipe connector," which is hereby incorporated by reference herein as if reproduced in its entirety.

TECHNICAL FIELD

The present disclosure relates generally to the field of wire bonding, and in particular embodiments, to a wire bonder and a gas pipe connector therefor.

BACKGROUND

A wire bonder (which may also be referred to as a wire bonding machine, or a bonder) is a machine or equipment used in electronics manufacturing, to automatically or semi-automatically connect, using wires, different components such as semiconductors (e.g., chips) and printed circuit boards (PCBs). An example of the wire bonder is a Kulicke & Soffa (KNS) wire bonder. Currently, in a wire bonder, e.g., a KNS wire bonder, a gas pipe is connected to a heating component, and a gas mixture is passed into the gas pipe to isolate oxygen when the heating component conducts heat to a workpiece or product, thereby preventing oxidation of the workpiece/product and protecting the workpiece/product.

In the existing technology, the gas pipe of the wire bonder (e.g., the KNS wire bonder) is often connected to the heating component through a metal connector. The gas pipe is generally made of rubber. The heating component is generally kept at a high temperature, e.g., 220° C., for a long time, and the heating component needs to move up and down frequently for bonding wires. During the manufacturing of the products, the heat of the high temperature heating component is directly transferred to the gas pipe through the metal connector. This causes the gas pipe to age, break and fall off very quickly, e.g., in about three months, leading to occurrence of product oxidation and affecting product quality.

Therefore, how to prevent or reduce the high temperature heat of the heating component from being directly transferred to the gas pipe, which reduces the service life of the gas pie, is a technical problem to be solved by people in the art.

SUMMARY

Technical advantages are generally achieved, by embodiments of this disclosure which describe a wire bonder and a gas pipe connector therefor.

An objective of the present disclosure is to provide a gas pipe connector that can block heat transfer between a heating component and a gas pipe, thereby increasing the service life of the gas pipe. Another objective of the present disclosure is to provide a wire bonder including the above-mentioned gas pipe connector.

In order to achieve the above objectives, embodiments of the present disclosure provides a gas pipe connector for connecting the gas pipe and the heating component. The gas pipe connector includes: a first connection end used to connect to the heating component; a second connection end used to connect the gas pipe; a heat insulation tube connecting the first connection end and the second connection end, which is used to reduce heat transfer between the first connection end and the second connection end.

In some embodiments, the gas pipe connector further includes: a first fastening sleeve connected to the exterior of a connection position between the first connection end and the heat insulation tube, and used to strengthen a connection between the first connection end and the heat insulation tube; and a second fastening sleeve connected to the exterior of a connection position between the second connection end and the heat insulation tube, and used to strengthen a connection between the second connection end and the heat insulation tube.

In some embodiments, the first fastening sleeve is nestedly or threadedly connected to the exterior of a connection position between the first connection end and the heat insulation tube; and the second fastening sleeve is nestedly or threadedly connected to the exterior of a connection position between the second connection end and the heat insulation tube.

In some embodiments, the first fastening sleeve and the second fastening sleeve are spaced apart from each other.

In some embodiments, one end of the heat insulation tube is provided with a first internal thread, and the other end of the heat insulation tube is provided with a second internal thread; and the first connection end is provided with a first external thread matching the first internal thread, and the second connection end is provided with a second external thread matching the second internal thread.

In some embodiments, the heat insulation tube is made of Teflon.

In some embodiments, the first connection end is a threaded connection end, and the second connection end is a pneumatic quick connector.

Embodiments of the present disclosure also provide a wire bonding machine, which includes a heating component and a gas pipe, and also includes the gas pipe connector described above. The gas pipe connector connects the gas pipe and the heating component.

Compared with the above background technology, the gas pipe connector provided in embodiment of the present disclosure is used to connect a gas pipe and a heating component. The gas pipe connector includes a first connection end, a second connection end and a heat insulation tube, wherein the first connection end is used to connect the heating component, the second connection end is used to connect the gas pipe, and the heat insulation tube connects the first connection end and the second connection end. The heat insulation tube is used to reduce heat transfer between the first connection end and the second connection end, thereby blocking the heat of the heating component from being transferred to the gas pipe. Compared with the conventional metal connector made in one-piece, the gas pipe connector provided in the embodiment of the present disclosure connects the first connection end and the second connection end through the heat insulation tube. That is, by setting the heat insulation tube between the gas pipe and the heating component, the heat from the heating component is blocked from being transferred to the gas pipe, which extends the service life of the gas pipe and ensures the bonding quality of products.

In accordance with one aspect of the present disclosure, a connector for connecting a gas pipe and a heating component of a wire bonder is provided that includes: a first connection end configured for connecting the connector to the heating component; a second connection end configured for connecting the connector to the gas pipe; and a heat-insulation tube connected between the first connection end and the second connection end, the heat-insulation tube being made of a heat-insulation material.

In accordance with another aspect of the present disclosure, a wire bonding machine is provided that includes a connector for connecting a gas pipe and a heating component of the wire bonding machine. The connector includes: a first connection end configured for connecting the connector to the heating component; a second connection end configured for connecting the connector to the gas pipe; and a heat-insulation tube connected between the first connection end and the second connection end, the heat-insulation tube being made of a heat-insulation material.

In accordance with another aspect of the present disclosure, a connector for connecting a gas pipe and a heating component of a wire bonding machine is provided that includes: a first connector configured for connecting the connector to the heating component; a second connector configured for connecting the connector to the gas pipe; a heat-insulation tube connected between the first connector and the second connector, the heat-insulation tube being made of a heat-insulation material; a first fastening sleeve fastening a connection between the first connector and the heat-insulation tube; and a second fastening sleeve fastening a connection between the second connector and the heat-insulation tube.

BRIEF DESCRIPTION OF THE DRAWINGS

In order to more clearly illustrate technical solutions in embodiments of the present application or in the art, drawings used in description of the embodiments of the present application or of the existing technology are briefly described in the following. Obviously, the drawings in the following description are only some embodiments of the application, and those of ordinary skill in the art may also obtain other drawings based on these drawings without making creative efforts.

For a more complete understanding of the present disclosure, and the advantages thereof, reference is now made to the following descriptions taken in conjunction with the accompanying drawings, in which:

FIG. 2A to FIG. 2F are schematic diagrams of another example gas pipe connector according to embodiments of the present disclosure, highlighting a front view, perspective views, an exploded view and a cross-sectional view of the gas pipe connector and a perspective view a parts of the gas pipe connector.

Figure 1A:
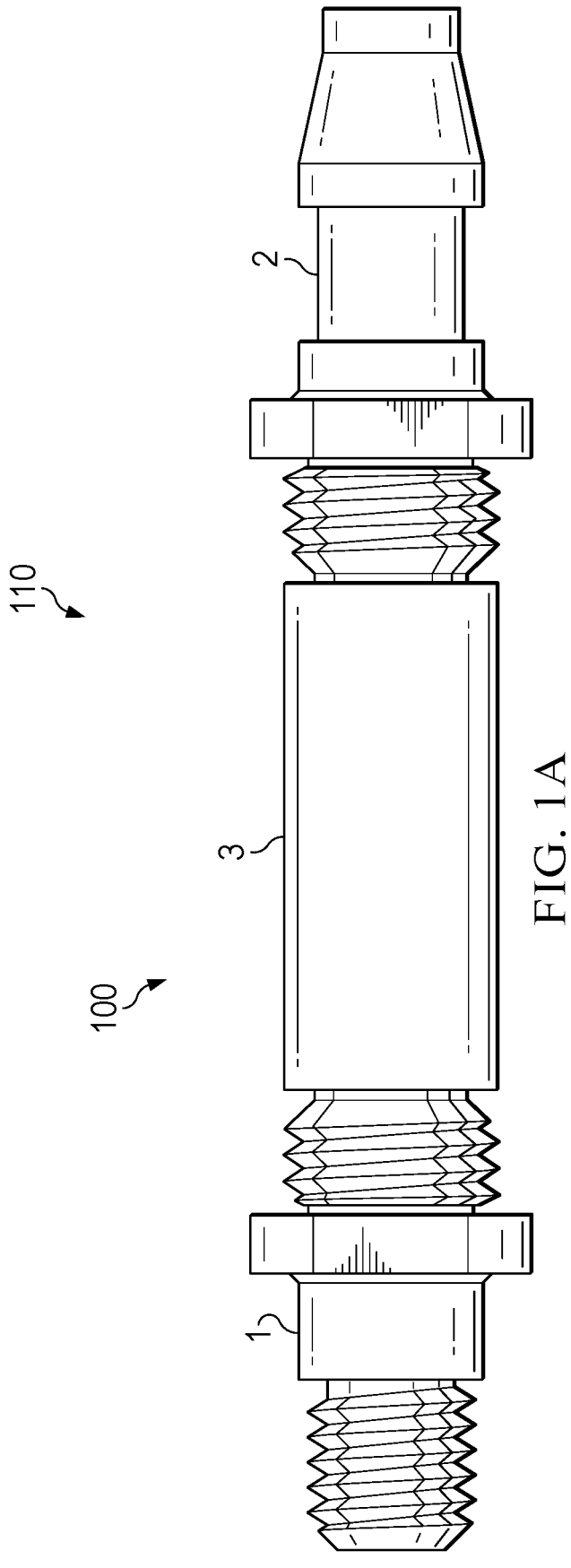
FIG. 1A to FIG. 1D are schematic diagrams of an example gas pipe connector according to embodiments of the present disclosure, highlighting a front view, a left side perspective view, a right side perspective view, and an exploded view of the gas pipe connector.
Figure 1B:
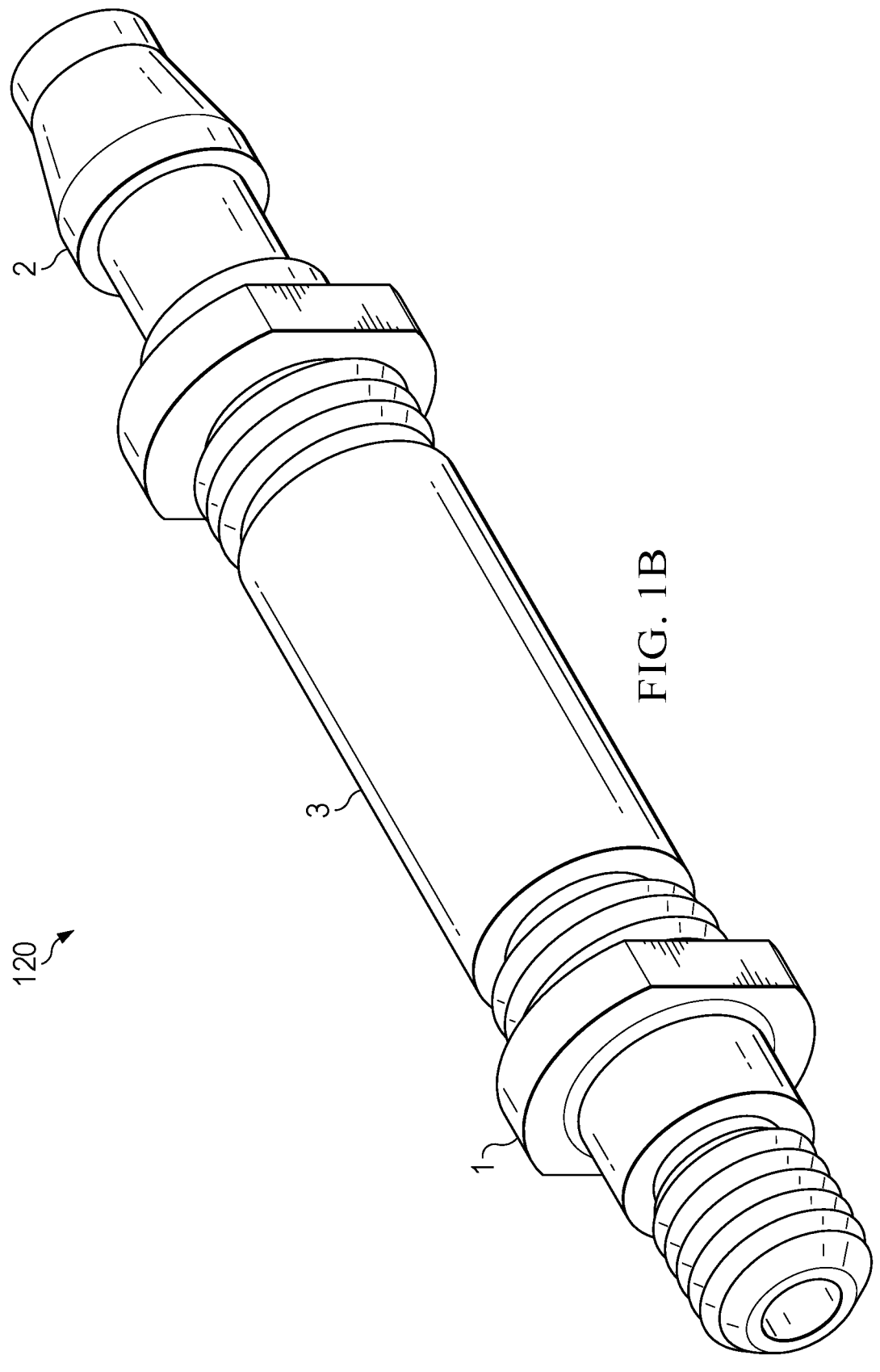
Figure 1C:
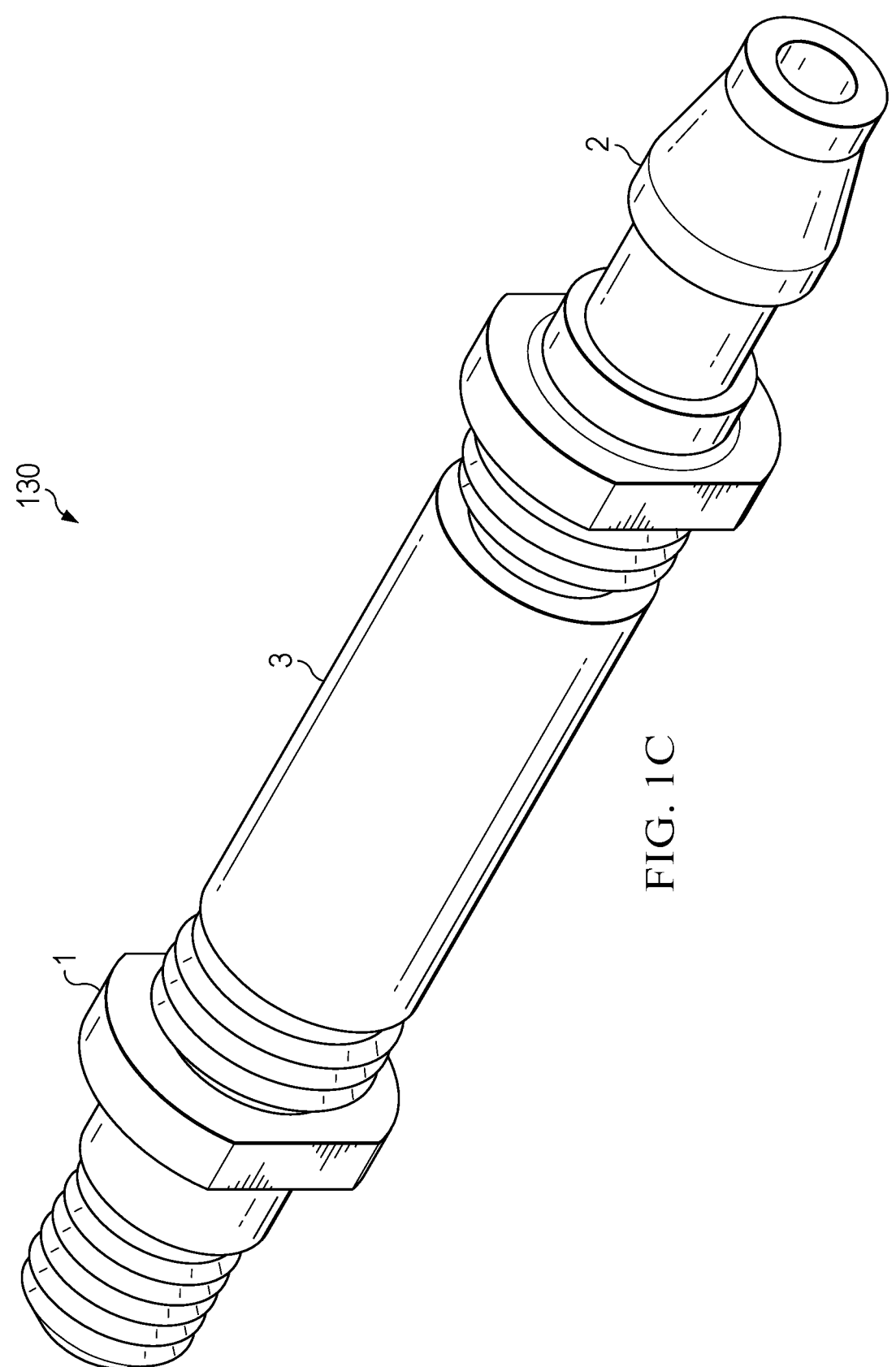
Figure 1D:
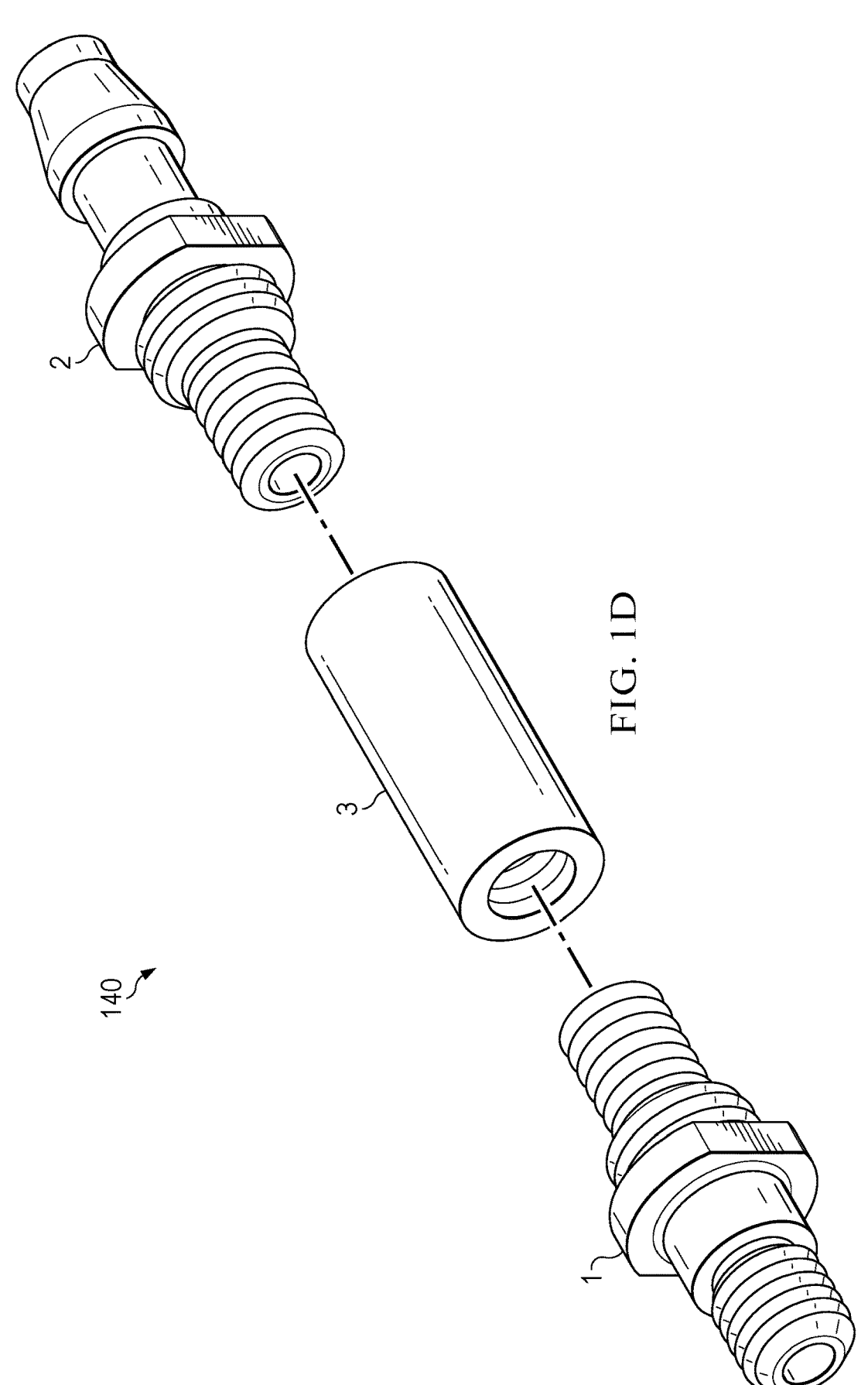

In the drawings, 1: First connection end, 2: Second connection end, 3: Heat insulation tube, 4: First fastening sleeve, 5: Second fastening sleeve.

Corresponding numerals and symbols in the different figures generally refer to corresponding parts unless otherwise indicated. The figures are drawn to clearly illustrate the relevant aspects of the embodiments and are not necessarily drawn to scale.

DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Further, one or more features from one or more of the following described embodiments may be combined to create embodiments not explicitly described, and features suitable for such combinations are understood within the scope of this disclosure. It is therefore intended that the appended claims encompass any such modifications or embodiments.

In the following, the technical solutions in embodiments of the present disclosure will be clearly and completely described with reference to the drawings in the embodiments of the present disclosure. Obviously, the described embodiments are some embodiments of the present disclosure, rather than all embodiments. Based on the embodiments of the present disclosure, all other embodiments obtained by those of ordinary skill in the art without creative efforts fall within the protection scope of the present disclosure.

The present disclosure will be further described in detail below in conjunction with the accompanying drawings and specific embodiments, for people in the art to better understand the solutions of the present disclosure.

It should be noted that the directional terms, such as "upper end", "lower end", "left side", "right side", and so on, described below are all defined based on the accompanying drawings of the present disclosure.

FIG. 1A to FIG. 1D are schematic diagrams of an example gas pipe connector 100 according to embodiments of the present disclosure, including a front view 110, a left side perspective view 120, a right side perspective view 130, and an exploded view 140 of the gas pipe connector 100. The gas pipe connector 100 may also be referred to as a connector 100 in the following.

The gas pipe connector 100 of the embodiments of the present disclosure is used to connect a gas pipe and a heating component of a wire bonder (or wire bonding machine). An example of the wire bonder is a Kulicke & Soffa (KNS) wire bonder. The gas pipe is configured to allow a shielding gas (or forming gas) to pass through and reaches a product being bonded using the heating component. The shielding gas reduces or isolate oxide on the wire surface during the wire bonding process, which increases reliability of the product. The shielding gas may be a mixture of hydrogen and nitrogen (e.g., at certain percentages), as an example, or may be other gas or combination of gases suitable for use by a wire bonder. The heating component of the wire bonder is configured to heat a workpiece, e.g., a wire or a solder, such that the workpiece is bonded to a target piece, e.g., a bonding pad of a die, or a lead.

Referring to FIG. 1A to FIG. 1D, the gas pipe connector 100 is generally in a tubular shape with a hollow passage in the middle extending through the gas pipe connector 100 along the axis of the tubular shape. In operation, the gas pipe connector 100 is connected between the gas pipe and the heating component, the shielding gas is passed through the gas pipe, the gas pipe connector 100 and the heating component, and reaches a workpiece for oxygen isolation during the heating of the workpiece by the heating component.

Figure 2A:
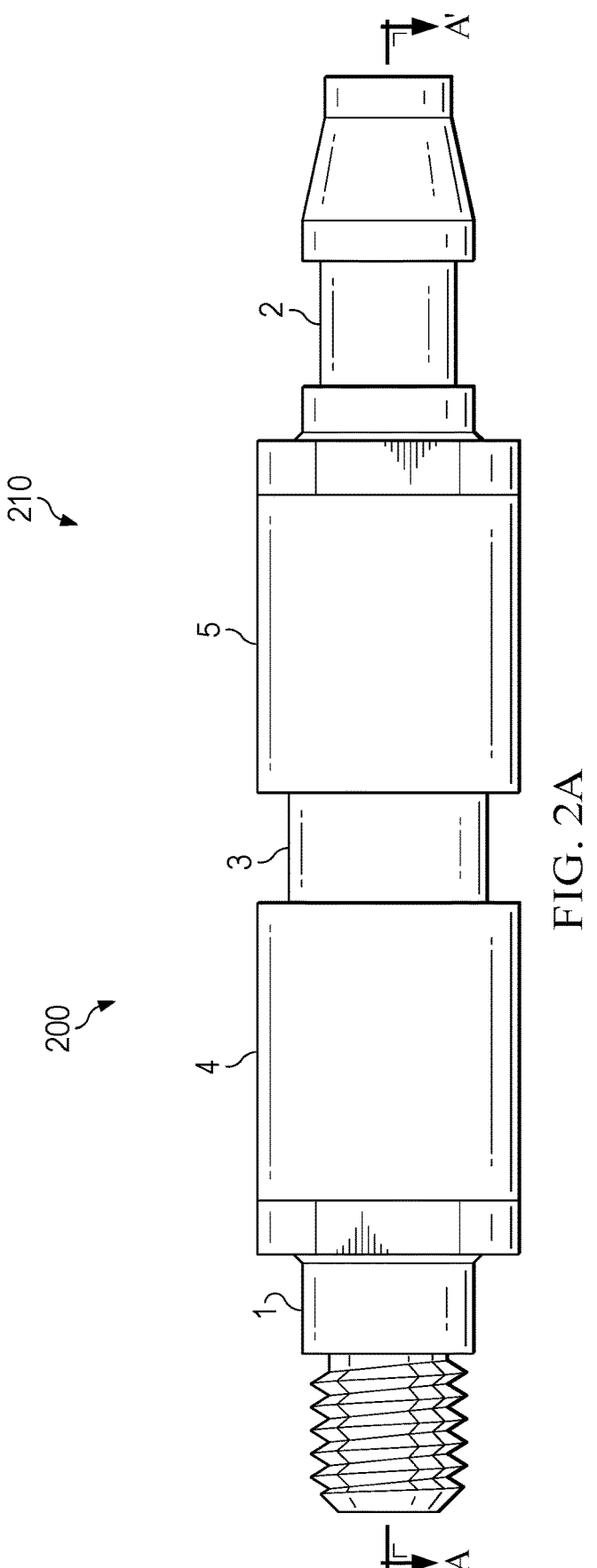
Figure 2B:
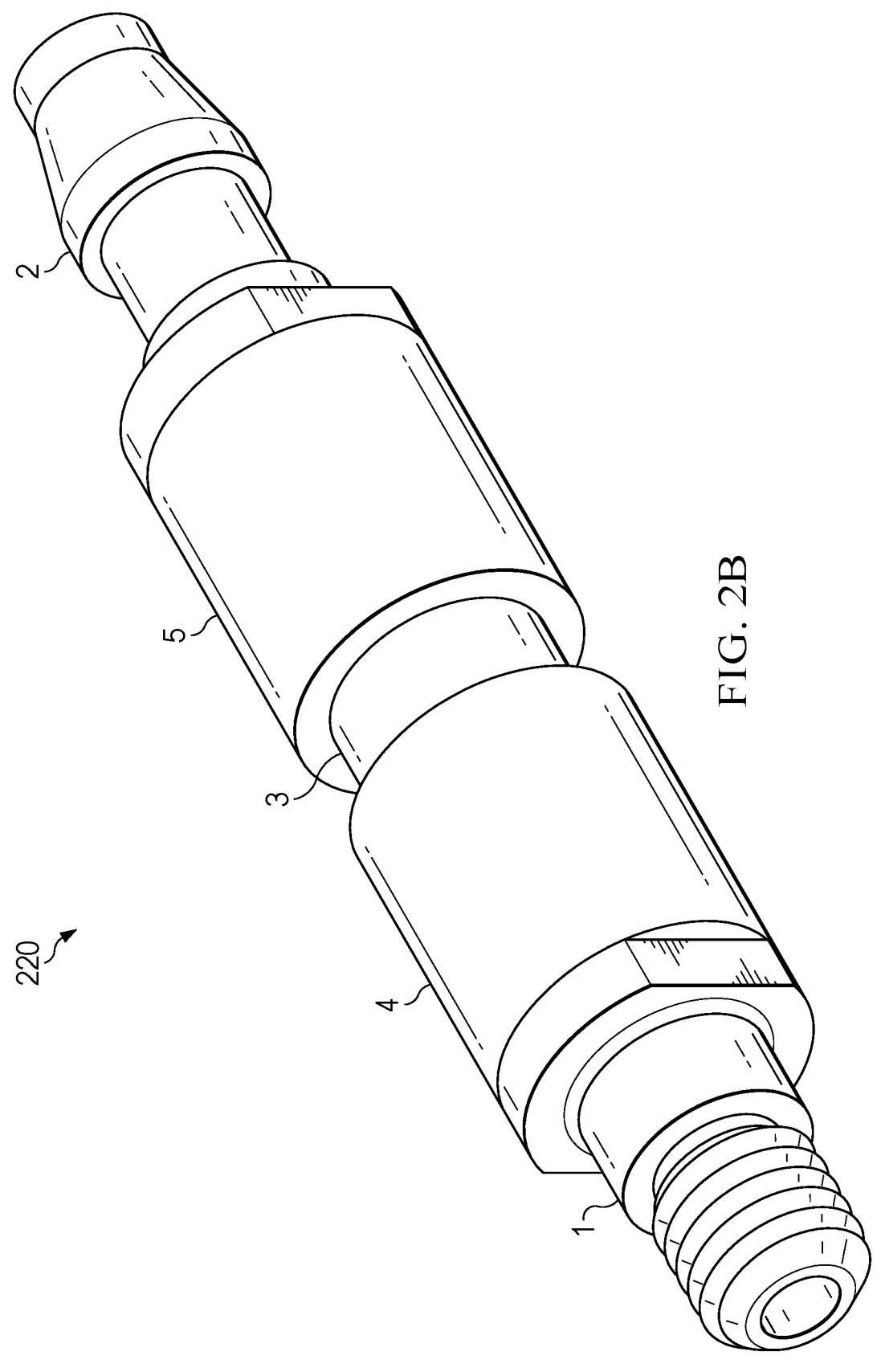
Figure 2C:
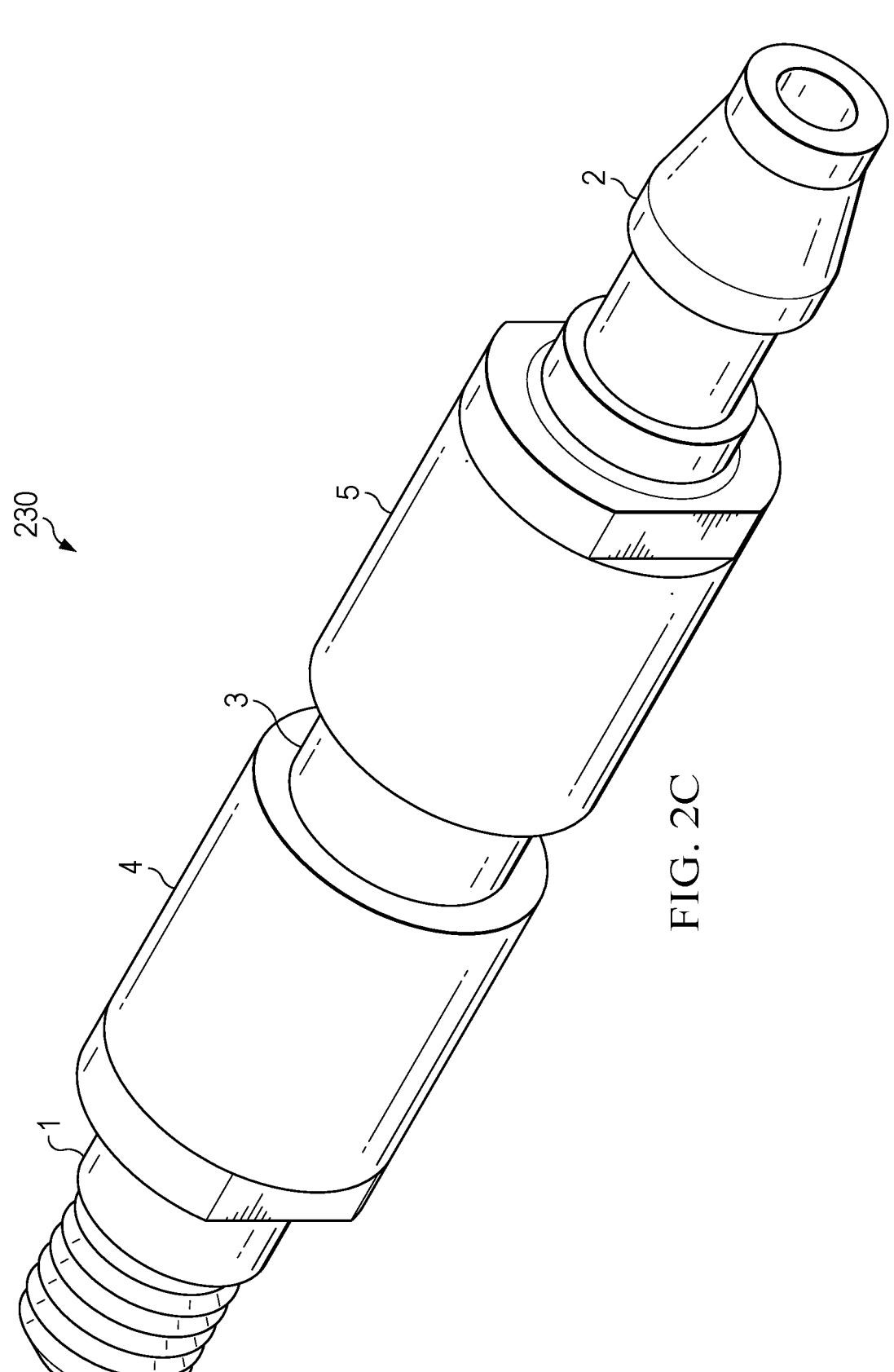
Figure 2D:
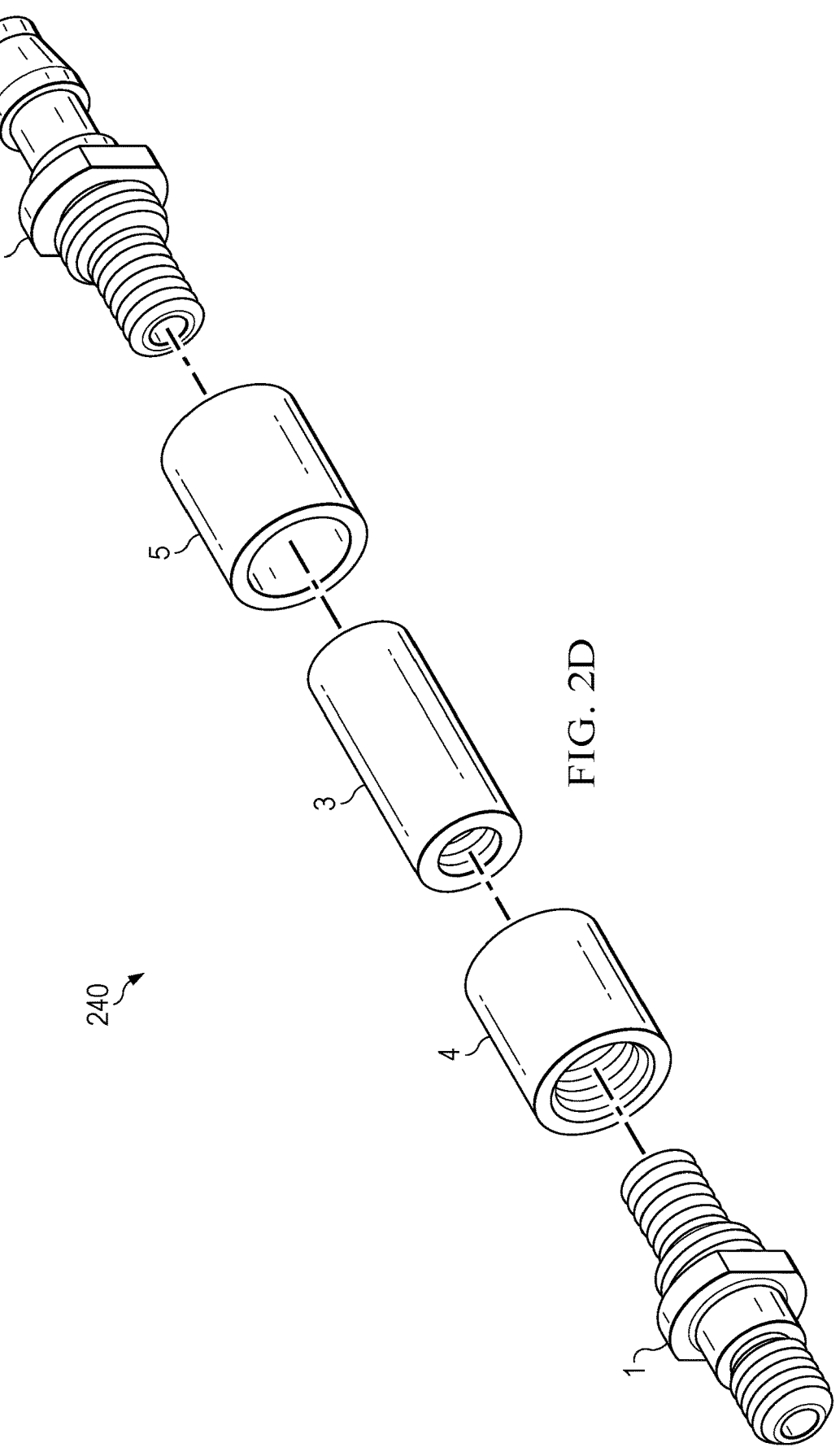
Figure 2F:
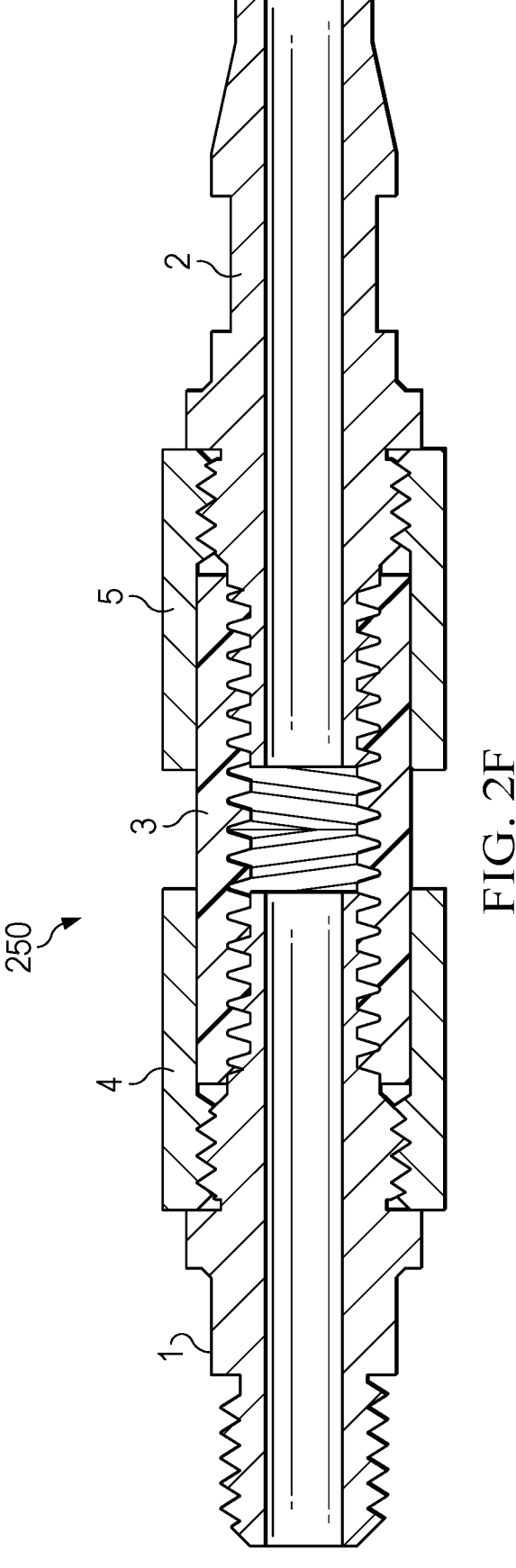

The gas pipe connector 100 includes a first connection end 1, a second connection end 2 and a heat insulation tube 3 connected between the first connection end 1 and the second connection end 2. The first connection end 1 is configured for connecting the connector 100 to the heating component. The second connection end 2 is configured for connecting the connector 100 to the gas pipe. The heat insulation tube 3 is configured for connecting to the first connection end 1 and the second connection end 2 in between. While the first connection end 1 and the second connection end 2 are connected through the heat insulation tube 3, they are not in contact with each other (as shown in FIG. 2F). The heat insulation tube 3 is used to block or reduce the heat transferred between the first connection end 1 and the second connection end 2, thus blocking the heat from being transferred to the gas pipe from the heating component, or reducing the heat transferred to the gas pipe from the heating component. The heat insulation tube 3 may be in a shape of a tube.

In some embodiments, the heat insulation tube 3 may be threadedly connected to both the first connection end 1 and the second connection end 2.

As an example, the first connection end 1 is threadedly connected to a first end of the heat insulation tube 3, and the second connection end 2 is threadedly connected to a second end of the heat insulation tube 3. The first end of the heat insulation tube 3 may be provided with a first internal thread (e.g., female thread), and the second end of the heat insulation tube 3 may be provided with a second internal thread. Correspondingly, the first connection end 1 may be provided with a first external thread (e.g., male thread) at a first end of the first connection end 1, such as a thread 16 as shown in FIG. 2E, that matches the first internal thread of the heat insulation tube 3. The second connection end 2 may be provided with a second external thread at a first end of the second connection end 2, such as a thread 26 as shown in FIG. 2E, that matches the second internal thread of the heat insulation tube 3. The first connection end 1 may be joined to the first end of the heat insulation tube 3 through the first internal thread and the first external thread, and the second connection end 2 may be joined to the second end of the heat insulation tube 3 through the second internal thread and the second external thread.

Those of ordinary skill in the art would recognize that the heat insulation tube 3 may be connected to the first connection end 1 and the second connection end 2 in various applicable manners, e.g., using glue, with certain conditions taken into consideration, such as tightness, life span, high-temperature resistance when used in the wire bonder for passing gases.

In some embodiments, the heat insulation tube 3 may be removable from the connector 100, e.g., it may be disconnectable from the first connection end 1 and the second connection end 2. For example, by connecting the heat insulation tube 3 to the first connection end 1 and the second connection end 2 using the threaded connection, the heat insulation tube 3 is removable. This has benefit that when the heat insulation tube 3 wears out or is damaged, the heat insulation tube 3 may be disconnected and replaced or repaired, without the need of discarding the whole connector 100. Flexibility is also provided when there is need to handle, e.g., replace, repair or clean, the heat insulation tube 3, the first connection end 1 or the second connection end 2.

In some embodiments, the heat insulation tube 3 may be made of materials that provide high heat-resistance, heat insulation and thermostability in an environment of high temperatures, e.g., in a range from 200° C. to 300° C. As an example, the temperature is 220° C. Examples of the materials may include Teflon, Polyimide (PI), or any other applicable materials existing or to be developed in future.

Teflon is Polytetrafluoroethylene (PTFE), commonly known as the "King of Plastics". It is a high molecular polymer made by polymerizing tetrafluoroethylene as a monomer. Its chemical formula is $(C_2F_4)_n$. It has the characteristics of excellent heat resistance and cold resistance, and high temperature resistance. It can be used for a long time at a temperature from −180° C. to 260° C. PI is a polymer containing imide groups belonging to the class of high-performance plastics.

In an embodiment, the heat insulation tube 3 may be made of Teflon, where the heat insulation tube 3 can effectively insulate the heat in an environment having a temperature of 220° C. for a long time, and is not prone to aging.

In some embodiments, the first connection end 1 is a threaded connector, for threadedly connecting the gas pipe connector 100 to the heating component. As an example, the first connection end 1 may be threadedly connected to the heat insulation tube 3 at the first end of the first connection end 1, and threadedly connected to the heating component at the second end of the first connection end 1, e.g., using a thread outside the second end of the first connection end 1, such as a thread 12 as shown in FIG. 2E.

In some embodiments, the second connection end 2 may be a pneumatic quick connector, for connecting the gas pipe connector 100 to the gas pipe. Pneumatic quick connectors are mainly used for quick connections of gas piping or pneumatic tools. In this embodiment, the pneumatic quick connector may be used to quickly connect the gas pipe connector 100 to the gas pipe, that is, no tool is needed to connect or disconnect the gas pipe and the gas pipe connector 100. As an example, the second connection end 2 may be threadedly connected to the heat insulation tube 3 at the first end of the second connection end 2, and connected to the gas pipe at the second end of the second connection end 2, with the second end of the second connection end 2 configured as a pneumatic quick connector, e.g., a pneumatic quick connector 22 as shown in FIG. 2E.

Compared with the conventional metal connector made in one-piece for connecting the gas pipe and the heat component, the gas pipe connector 100 provided in the embodiments of the present disclosure connects the first connection end 1 and the second connection end 2 through the heat insulation tube 3. That is, the embodiments set the heat insulation tube 3 between the gas pipe and the heating component, which effectively reduces the heat transferred from the heating component to the gas pipe, thereby extending the service life of the gas pipe and ensuring the bonding quality of products.

The connection between the first connection end 1 and the heat insulation tube 3 and the connection between the second connection end 2 and the heat insulation tube 3 may be reinforced or strengthened to improve the connection stability. Various mechanisms may be used to achieve this purpose. In some embodiments, the gas pipe connector 100 may include a first fastening sleeve 4 and a second fastening sleeve 5, which are used to reinforce the connections. FIG. 2A to FIG. 2F are diagrams of an example gas pipe connector 200, which is the gas pipe connector 100 with the first fastening sleeve 4 and the second fastening sleeve 5 fastened. FIG. 2A is an example front view 210 of the gas pipe connector 200. FIG. 2B is a left side perspective view 220 of the gas pipe connector 200. FIG. 2C is a right side perspective view 230 of the gas pipe connector 200. FIG. 2D is a exploded view 240 of the gas pipe connector 200. FIG. 2E is a perspective view of the first connection end 1 and the second connection end 2 of the gas pipe connector 200. FIG. 2F is a cross-sectional view of the gas pipe connector 200 along a line AA'.

In an embodiment, the first fastening sleeve 4 may be fastened to the exterior of a first connection position (also referred to as a first portion) where the first connection end 1 and the heat insulation tube 3 are connected. The first fastening sleeve 4 may be used to reinforce the connection between the first connection end 1 and the heat insulation tube 3. The second fastening sleeve 5 may be fastened to the exterior of a second connection position (also referred to as a second portion) where the second connection end 2 and the heat insulation tube 3 are connected. The second fastening sleeve 5 may be used to reinforce the connection between the second connection end 2 and the heat insulation tube 3.

By providing the first fastening sleeve 4 and the second fastening sleeve 5, the first connection position of the first connection end 1 and the heat insulation tube 3, and the second connection position of the second connection end 2 and the heat insulation tube 3, can be reinforced respectively. This improves the stability and firmness of the connection between the first connection end 1 and the heat insulation tube 3, and the connection between the second connection end 2 and the heat insulation tube 3.

In some embodiments, the first tightening sleeve 4 may be nestedly connected to the exterior of the first connection position (the first portion) between the first connection end 1 and the heat insulation tube 3. The second tightening sleeve 5 may be nestedly connected to the exterior of the second connection position (the second portion) between the second connection end 2 and the heat insulation tube 3. As an example, the first fastening sleeve 4 may be interference-fitted to the exterior of the first connection position between the first connection end 1 and the heat insulation tube 3, to form a wrapping structure outside the first connection position between the first connection end 1 and the heat insulation tube 3. The second fastening sleeve 5 may be interference-fitted to the exterior of the second connection position between the second connection end 2 and the heat insulation tube 3, to form a wrapping structure outside the second connection position between the second connection end 2 and the heat insulation tube 3.

In some embodiments, the first tightening sleeve 4 may be threadedly connected to the exterior of the first connection position between the first connection end 1 and the heat insulation tube 3, and the second tightening sleeve 5 may be threadedly connected to the exterior of the second connection position between the second connection end 2 and the heat insulation tube 3. For example, threaded structures may be provided on the heat-insulation tube 3 and the corresponding connection ends. Correspondingly, the tightening sleeves may also be provided with threaded structures (e.g., internal threads), such that the fastening sleeves are fastened to the exterior of the heat insulation tube 3 and the corresponding connection ends through threads. In an example, the exterior of the first connection position and the second connection position may be provided with threads, and the interior of the first tightening sleeve 4 and the second tightening sleeve 5 may be provided with threads matching that of the first connection position and the second connection position. The first tightening sleeve 4 and the second tightening sleeve 5 are thus threadedly fastened to the exterior of the gas pipe connector 200 at the first connection position and the second connection position.

In some embodiments, the first tightening sleeve 4 may be threadedly connected to a portion of the exterior of the first connection end 1, e.g., a thread (or portion) 14 as shown in FIG. 2E, and have a length such that the first tightening sleeve 4 wraps around the portion 14 and connection portions of the heat insulation tube 3 and the first connection end 1, as shown in FIG. 2F. Similarly, in some embodiments, the second tightening sleeve 5 may be threadedly connected to a portion of the exterior of the second connection end 2, e.g., a portion 24 as shown in FIG. 2E, and have a length such that the second tightening sleeve 5 wraps around the portion 24 and connection portions of the heat insulation tube 3 and the second connection end 2, as shown in FIG. 2F.

In the example shown in FIGS. 2E and 2F, the first connection end 1 may have the thread (or a first portion) 12 configured to connect to the heating component, the thread (or a second portion) 16 configured to connect to the heat insulation tube 3, and the thread (or a third portion) 14 configured to connect to the first tightening sleeve 4. The second connection end 2 may have the thread (or a first portion) 22 configured to connect to the gas pipe, the thread (or a second portion) 26 configured to connect to the heat insulation tube 3, and the thread (or a third portion) 24 configured to connect to the second tightening sleeve 5. In some embodiments, when connected, the third portion 14 of the first connection end 1 may adjoin the first end of the heat insulation tube 3, and the third portion 24 of the second connection end 2 may adjoin the second end of the heat insulation tube 3. The portion between the first portion 12 and the third portion 14 of the first connection end 1 may be configured for separating the portions 12-16, for handling the first connection end 1, e.g., for connecting the first connection end 1 to the heating component and the heat insulation tube 3, and/or for other purposes, and its shape and dimension is configurable and is not limited hereto. Similarly, the portion between the first portion 22 and the third portion 24 of the second connection end 2 may be configured for separating the portions 22-26, for handling the second connection end 2, e.g., for connecting the second connection end 2 to the gas pipe and the heat insulation tube 3, and/or for other purposes, and its shape and dimension is configurable and is not limited hereto.

In some embodiments, the first tightening sleeve 4 may be threadedly connected to the thread (third portion) 14 and also a portion of the exterior at the first end of the heat insulation tube 3, and the second tightening sleeve 5 may be threadedly connected to the thread (third portion) 24 and also a portion of the exterior at the second end of the heat insulation tube 3. In this case, the heat insulation tube 3 may be provided with a third external thread at its first end and a fourth external thread at its second end. The first tightening sleeve 4 may have an internal thread that matches the thread 14 and the third external thread of the heat insulation tube 3. The second tightening sleeve 5 may have an internal thread that matches the thread 24 and the fourth external thread of the heat insulation tube 3. The first tightening sleeve 4 and the second tightening sleeve 5 may thus be threadedly connected to the connector 100, reinforcing the connections of the connector 100.

In some embodiments, the first fastening sleeve 4 and the second fastening sleeve 5 may be positioned with space apart from each other. That is, the first fastening sleeve 4 and the second fastening sleeve 5 are not in contact with each other. As shown in FIG. 2A and FIG. 2F, a portion of the heat insulation tube 3 between the first fastening sleeve 4 and the second fastening sleeve 5 is exposed.

Both the first fastening sleeve 4 and the second fastening sleeve 5 may be made of metal. By arranging the first fastening sleeve 4 and the second fastening sleeve 5 at an interval may further reduce the heat transferred between the first fastening sleeve 4 and the second fastening sleeve 5.

The dimensions of the gas pipe connector 100, e.g., the lengths, diameters and thickness of different portions 1-5, may be configured based on the wire bonder to be applied to, the gas pipe and the heating component. As an example, the length of the entire gas pipe connector 100/200 may be about 26 mm. The length may be between about 25 mm and 27 mm, based on the wire bonder structure and the heat isolation requirement. The length of the first connection end 1 may be about 13.5 mm, and the inside diameter may be about 1.25 mm. The length of the heat insulation tube 3 may be about 9 mm, the inside diameter may be about 2 mm and the outside diameter may be about 4 mm. The length of the second connection end 2 may be about 10.5 mm, and the inside diameter may be about 1.25 mm. The length of the first fastening sleeve 4 and the second fastening sleeve 5 may be about 6.5 mm, and the outside diameter may about 5 mm.

The shapes (e.g., the shapes of the first, second and third portions) of the first connection end 1 and the second connection end 2 may be configured according to the respective connection manners to be used for connecting the first connection end 1 and the second connection end 2 to the heat insulation tube 3, the heating component and the gas pipe, and optionally, the first tightening sleeve 4 and the second tightening sleeve 5. FIGS. 1A-1D and 2A-2E merely show examples for illustration purposes.

Figure 3:
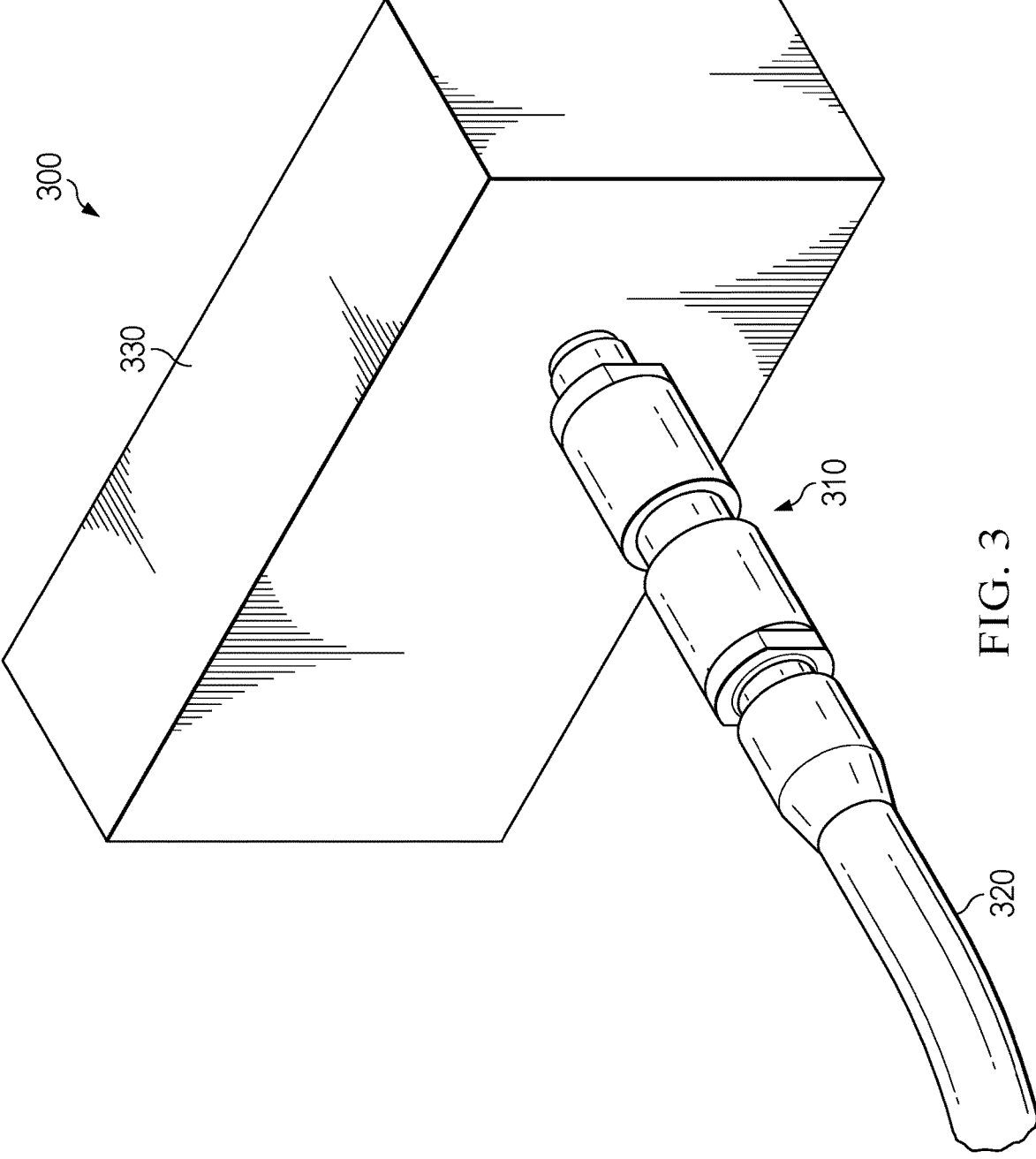
FIG. 3 is a schematic diagram of an example gas pipe connector connected between a gas pipe and a heating component of a wire bonder according to embodiments of the present disclosure.

In some embodiments, a wire bonder may be provided including an embodiment gas pipe connector as described above. FIG. 3 is a schematic diagram of an example wire bonder 300 according to embodiments of the present disclosure. The wire bonder 300 may include a heating component 310 and a gas pipe 320, which are connected via a gas pipe connector 330. The gas pipe connector 330 may be the gas pipe connector 100 or the gas pipe connector 200 as described above. The gas pipe connector 330 may be connected to the heating component 310 through threaded connection, and may be connected to the gas pipe 320 through pneumatic connection. For the heating component 310, the gas pipe 320 and other parts of the wire bonder 300, reference may be made to the existing wire bonder technologies, and details will not be described herein.

It should be noted that in the present disclosure specification, relational terms such as first and second are only used to distinguish one entity from other entities, and do not necessarily require or imply existence of any such actual relationship or ordering between these entities.

The wire bonder and its gas pipe connector provided by this application are described in detail above. In the present disclosure, specific examples are used to illustrate the principle and implementation of embodiments of the present application. The descriptions of the above embodiments are only used to help understand the solutions and core ideas of the present application. Those of ordinary skill in the art should understand that they can make modifications or alterations to the embodiments without departing from the principle of the present disclosure. These modifications or alterations also fall within the protection scope of the claims of the present application.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A connector of a wire bonder, comprising:
a first connection end connecting the connector to a heating component of the wire bonder;
a second connection end connecting the connector to a gas pipe of the wire bonder; and
a heat-insulation tube connected between the first connection end and the second connection end, the heat-insulation tube being made of a heat-insulation material;
wherein the first connection end is threadedly connected to a first end of the heat-insulation tube, and the second connection end is threadedly connected to a second end of the heat-insulation tube, the second end being opposite to the first end.

2. The connector according to claim 1, further comprising:
a first fastening sleeve connected to exterior of the connector around a first connection position where the first connection end and the heat-insulation tube are connected; and
a second fastening sleeve connected to the exterior of the connector around a second connection position where the second connection end and the heat-insulation tube are connected.

3. The connector according to claim 2, wherein the first fastening sleeve and the second fastening sleeve are nestedly connected to the exterior of the connector.

4. The connector according to claim 2, wherein the first fastening sleeve and the second fastening sleeve are threadedly connected to the exterior of the connector.

5. The connector according to claim 2, wherein the first fastening sleeve and the second fastening sleeve are spaced apart from each other.

6. The connector according to claim 1, wherein the first end of the heat-insulation tube is provided with a first internal thread, and the second end of the heat-insulation tube is provided with a second internal thread; and
the first connection end is provided with a first external thread matching the first internal thread of the heat-insulation tube, and the second connection end is provided with a second external thread matching the second internal thread of the heat-insulation tube.

7. The connector according to claim 1, wherein the heat-insulation tube is made of Teflon.

8. The connector according to claim 1, wherein the heat-insulation tube is made of Polyimide (PI).

9. The connector according to claim 1, wherein the first connection end has a threaded connection end configured for connecting the connector to the heating component, and the second connection end has a pneumatic quick connector end for connecting the connector to the gas pipe.

10. A wire bonding machine comprising a connector for connecting a gas pipe and a heating component of the wire bonding machine, the connector comprising:

a first connection end configured for connecting the connector to the heating component;

a second connection end configured for connecting the connector to the gas pipe; and a heat-insulation tube connected between the first connection end and the second connection end, the heat-insulation tube being made of a heat-insulation material;

wherein the connector further comprises:

a first fastening sleeve connected to exterior of the connector around a first connection position where the first connection end and the heat-insulation tube are connected; and a second fastening sleeve connected to the exterior of the connector around a second connection position where the second connection end and the heat-insulation tube are connected.

11. The wire bonding machine according to claim 10, wherein the first fastening sleeve and the second fastening sleeve are nestedly or threadedly connected to the exterior of the connector.

12. The wire bonding machine according to claim 10, wherein the first fastening sleeve and the second fastening sleeve are spaced apart from each other.

13. The wire bonding machine according to claim 10, wherein the first connection end is threadedly connected to a first end of the heat-insulation tube, and the second connection end is threadedly connected to a second end of the heat-insulation tube, the second end being opposite to the first end.

14. The wire bonding machine according to claim 13, wherein the first end of the heat-insulation tube is provided with a first internal thread, and the second end of the heat-insulation tube is provided with a second internal thread; and the first connection end is provided with a first external thread matching the first internal thread, and the second connection end is provided with a second external thread matching the second internal thread.

15. The wire bonding machine according to claim 10, wherein the heat-insulation tube is made of Teflon or Polyimide (PI).

16. The wire bonding machine according to claim 10, wherein the first connection end has a threaded connection end for connecting the connector to the heating component, and the second connection end has a pneumatic quick connector end for connecting the connector to the gas pipe.

17. A connector of a wire bonding machine, comprising:

a first connector connecting the connector to a heating component of the wire bonding machine;

a second connector connecting the connector to a gas pipe of the wire bonding machine;

a heat-insulation tube removably connected between the first connector and the second connector, the heat-insulation tube being made of a heat-insulation material;

a first fastening sleeve fastening a connection between the first connector and the heat-insulation tube; and a second fastening sleeve fastening a connection between the second connector and the heat-insulation tube.

18. The connector according to claim 17, wherein the heat-insulation tube is made of Teflon or Polyimide (PI).

19. The connector according to claim 17, wherein the first fastening sleeve and the second fastening sleeve are nestedly or threadedly connected to the exterior of the connector.

20. The connector according to claim 17, wherein the first connector has a threaded connection end configured for connecting the connector to the heating component, and the second connector has a pneumatic quick connector end for connecting the connector to the gas pipe.

* * * * *